US005250223A

United States Patent [19]

Quintini

[11] Patent Number: 5,250,223

[45] Date of Patent: Oct. 5, 1993

[54] SOLUTION OF A FLUORESCENT WHITENING AGENT

[75] Inventor: Massimo Quintini, Bergamo, Italy

[73] Assignee: Sigma Prodotti Chimici SpA, Milan, Italy

[21] Appl. No.: 608,917

[22] Filed: Nov. 5, 1990

[30] Foreign Application Priority Data

Nov. 8, 1989 [IT] Italy ............................ 22307 A/89

[51] Int. Cl.[5] ............................ C09K 11/06

[52] U.S. Cl. ............................ 252/301.23; 252/301.21; 252/543

[58] Field of Search ............................ 252/301.23, 301.21, 252/543

[56] References Cited

U.S. PATENT DOCUMENTS

| | | | |
|---|---|---|---|
| 3,309,319 | 3/1967 | Coward | 252/543 |
| 3,360,479 | 12/1967 | Hausermann . | |
| 3,689,429 | 9/1972 | Deubel | 252/301.23 |
| 3,871,898 | 3/1975 | Reinert et al. . | |
| 4,271,036 | 6/1981 | Uhl | 252/301.23 |
| 4,466,900 | 8/1984 | Horlacher et al. . | |
| 4,605,511 | 8/1986 | Fringeli | 252/301.23 |
| 4,717,502 | 1/1988 | Schmid . | |

FOREIGN PATENT DOCUMENTS 0237119 9/1987 European Pat. Off. .

*Primary Examiner*—Prince Willis, Jr.
*Assistant Examiner*—Alan D. Diamond
*Attorney, Agent, or Firm*—Young & Thompson

[57] ABSTRACT

Solution of a fluorescent whitening agent to be used in the formulation of liquid detergents for hand or machine washing.

The solution comprises:

a) the substantially water-insoluble fluorescent whitening agent of formula:

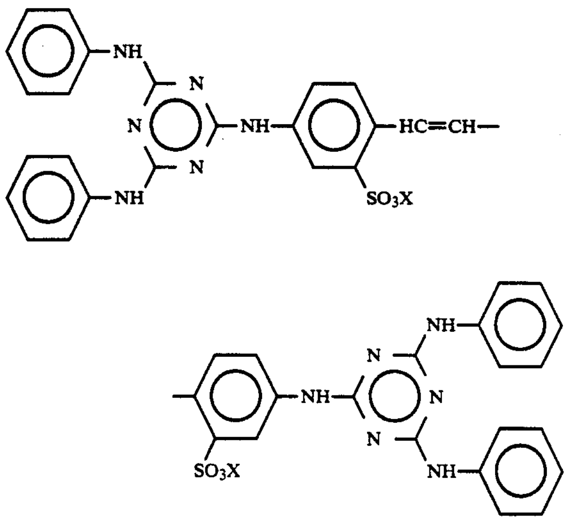

wherein X is sodium, potassium, ammonium or an amine; in an amount ≧5% and ≦50% by weight;

b) a solvent selected among: ethylene glycol, 1,3 propylene glycol, 1,2 propylene glycol, diethylene glycol, polyethylene glycol with molecular weight up to 400, and mixtures thereof, in an amount ≧50% and ≦95% by weight c) water, in an amount >0% and ≦10% by weight.

1 Claim, No Drawings

SOLUTION OF A FLUORESCENT WHITENING AGENT

BACKGROUND OF THE INVENTION

1. Field of the Invention

The present invention concerns a solution containing a fluorescent whitening agent and, in particular, a solution of this type suited for use in the formulation of liquid detergents both for hand washing and for machine washing.

Liquid detergents for washing are, in recent years, increasingly conquering the market which was traditionally—essentially for technical reasons—mostly enjoyed by solid detergents, both in powder and in granules. At present, liquid detergents form 15-20% of the total amount of detergents produced in Europe, while reaching 40% of the total amount produced in North America.

The fluorescent whitening agents (hereinafter called FWA for the sake of brevity) are substances which act by absorbing the ultraviolet radiation and re-emitting it at longer wave lengths, corresponding to the blue/violet radiation in the visible field. When the FWA are applied to a fabric, mixed with a detergent solution, they eliminate or reduce any undesirable yellowish shading on white fabrics and they give a brighter and more brilliant hue to coloured fabrics. The known FWA belong to various classes of different chemical compounds, but the ones that are by far the most widely known and used in detergents, are the stilben-triazine-based FWA, which are particularly suited to develop their properties on prevalently cellulosic substrata.

2. Description of the Prior Art

In producing liquid detergents, it is evidently preferable for all the basic components forming part of the formulation to be available in a liquid state from the outset. This allows simplifying the plant for producing the detergents, as well as the automation of the different operations for proportioning and mixing the individual components.

The preferred condition hardly applies to the commercially known FWA, which are scarcely water soluble and are thus used only in solid form to produce liquid detergent compositions. Such FWA are included in the general formula:

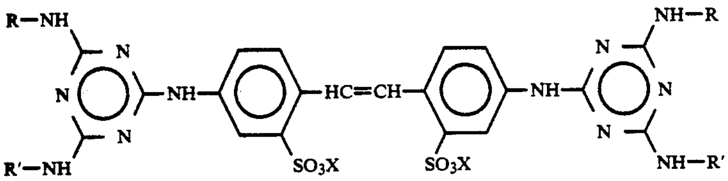

wherein X is sodium, potassium, ammonium or an amine; R and R' are the phenyl group, or the phenyl group substituted with methyl, ethyl, or halogens.

Among the different FWA corresponding to the above general formula, the one wherein R=R'=phenyl is particularly interesting, both because it has already been used in the sector and because it has the property to prevent the forming of bleaching stains (non-staining effect), as described for example in EP-A-237 119. The present invention thus specifically refers to the use of an FWA having such a structure, simply indicated hereinafter as "FWA of the invention".

Given the low solubility of the FWA of the invention, in present processes for producing liquid detergents—which make use of said FWA—a specific step has to be provided for dissolving the FWA in said detergent or, alternatively, to pre-dissolve the FWA in the surface-active base of the detergents. This requires a more complicated plant, supplementary times for mixing and dissolving the FWA and, ultimately, an increase in the final cost of the detergent. It would hence be important and extremely useful—in order to facilitate and make more economical the preparation of liquid detergents containing said type of FWA—to be able to use the FWA of the invention as a clear fluid solution, easy to be metered.

SUMMARY OF THE INVENTION

The object of the present invention is therefore to supply a solution of the FWA of the invention, having the aforespecified physical properties and being thus suited for use, as it is, in the production of liquid detergents for both hand and machine washing.

Another object of the present invention is to supply a solution of the FWA of the invention based on solvents, or mixtures thereof, which do not interfere with the physical stability of the detergent solution, nor with the washing process carried out with the same.

According to the present invention, said objects are reached by means of an FWA solution comprising:

a) the substantially water-insoluble fluorescent whitening agent of formula:

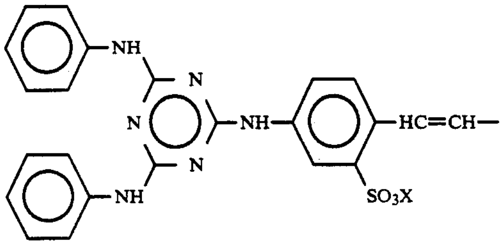

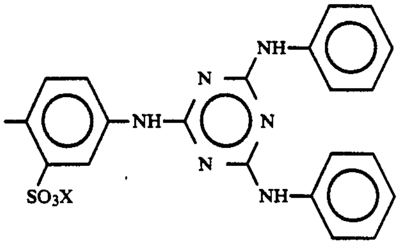

wherein X is sodium, potassium, ammonium or an amine; in an amount ≧5% and ≦50% by weight;

b) a solvent selected among: ethylene glycol, 1,3 propylene glycol, 1,2 propylene glycol, diethylene glycol, polyethylene glycol with molecular weight up to 400, and mixtures thereof, in an amount ≧50% and ≦95% by weight;

c) water, in an amount >0% and ≦10% by weight.

The Applicant has in fact surprisingly found—after accurate tests—that, when the FWA of the invention is incorporated in a formulation as that specified heretofore, not only does one reach the intended FWA solution having physical properties suited for its direct use in preparing liquid detergents, but one also obtains, when using such detergents, an improved whiteness effect in respect of the liquid detergents in which the FWA has been incorporated in the solid state, or anyhow not pre-dissolved in a suitable solvent.

The invention will be more particularly described hereinafter, with reference to some examples of preparation of FWA solutions obtained according to the teachings of the present invention.

DESCRIPTION OF THE PREFERRED EMBODIMENTS

Example 1

15 g of the FWA of the invention are dissolved in 55 g of diethylene glycol at the temperature of 80° C. After filtration, one obtains a clear solution, stable at least down to −15° C. and with viscosity 150 cps at 20° C.

Example 2

25 g of the FWA of the invention are dissolved in 92 g of polyethyleneglycol with 400 molecular weight, at the temperature of 90° C. After filtration one obtains a clear solution, stable down to −10° C. and with viscosity 1,200 cps at 20° C.

Example 3

A—To a liquid detergent having the following composition:

| | |
|---|---|
| water | 44.7 g |
| dodecylbenzenesulphonic acid | 4.0 g |
| lauryl ether sodium sulphate | 4.0 g |
| triethanolamine lauryl sulphate | 4.0 g |
| ethoxylated natural alcohol C10-C12 (9 mols oxyethylene) | 20.0 g |
| Polyglycol of 400 m.w. | 20.0 g |
| triethanolamine | 2.3 g |

the FWA of the present invention has been added in solid form, in an amount of 0.18% by weight, and dispersed by proper stirring.

With the liquid detergent thus obtained, a washing bath with a 5 g/l concentration has been prepared. Samples of stained cotton fabric EMPA/301, having an area of 100 sq. cm., have been subjected to 10 Linitest washing cycles in a 1:10 weight ratio to the described washing bath, at the temperature of 60° C. The degree of whiteness of the fabric has then been measured with an Elrepho Zeiss spectrophotometer, and the respective results—after 5 and 10 washes—expressed according to the Berger formula for the degree of whiteness (W), are reported in the Table hereunder.

B—To a liquid detergent as described in A, the FWA of the present invention has been added in an amount of 0.86% of a solution prepared as in Example 1.

With such a detergent solution, washing tests as described in A have been carried out.

The following Table reports the degrees of whiteness obtained.

TABLE

| Example | W after 5 washes | W after 10 washes |
|---|---|---|
| 3A | 158.2 | 169.7 |
| 3B | 160.1 | 171.3 |

From the previous Examples, it clearly results that the FWA solution according to the present invention has fully achieved the intended objects. It in fact provides characteristics of viscosity which are fully suited to allow easy metering and fast mixing into detergent solutions and, furthermore, it has characteristics of stability such as to allow preserving the stocks with no need to condition the warehouse.

Washing tests carried out with liquid detergents incorporating the FWA solution according to the present invention have moreover confirmed that an improved whiteness effect can be obtained in respect of washes carried out with liquid detergents wherein the same FWA has been incorporated in solid form.

I claim:

1. A clear stable solution of a fluorescent whitening agent consisting essentially of:

a) a substantially water-insoluble fluorescent whitening agent of formula:

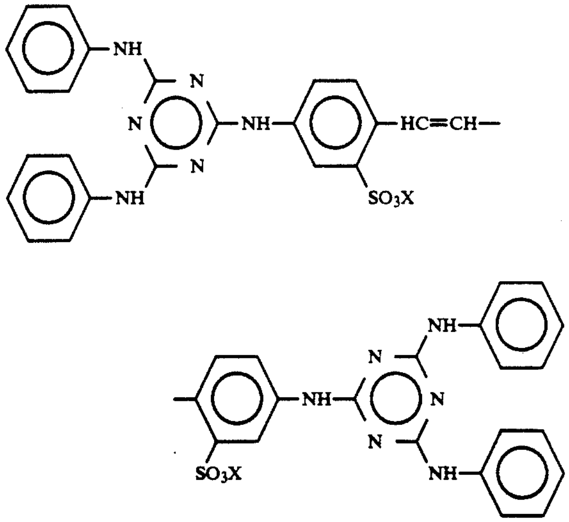

wherein X is sodium, potassium, ammonium or an amine; in an amount ≧5% and ≦50% by weight;

b) a solvent selected from the group consisting of ethylene glycol, 1,3 propylene glycol, 1,2 propylene glycol, diethylene glycol, polyethylene glycol with molecular weight up to 400, and mixtures thereof, in an amount ≧50% and ≦95% by weight;

c) water, in an amount >0% and ≦10% by weight.

* * * * *